(12) United States Patent
Vadrevu et al.

(10) Patent No.: US 9,465,872 B2
(45) Date of Patent: Oct. 11, 2016

(54) SEGMENT SENSITIVE QUERY MATCHING

(75) Inventors: Srinivas Vadrevu, Milpitas, CA (US);
Emre Velipasaoglu, San Francisco, CA (US)

(73) Assignee: YAHOO! Inc., Sunnyvale, CA (US)

( * ) Notice: Subject to any disclaimer, the term of this patent is extended or adjusted under 35 U.S.C. 154(b) by 243 days.

(21) Appl. No.: 12/538,711

(22) Filed: Aug. 10, 2009

(65) Prior Publication Data

US 2011/0035374 A1   Feb. 10, 2011

(51) Int. Cl.
*G06F 17/30*   (2006.01)

(52) U.S. Cl.
CPC .............................. *G06F 17/30864* (2013.01)

(58) Field of Classification Search
USPC ........ 707/772; 715/234, 240, 241, 243, 246, 715/247, 254, 273
See application file for complete search history.

(56) References Cited

U.S. PATENT DOCUMENTS

| | | | |
|---|---|---|---|
| 6,300,947 B1 | 10/2001 | Kanevsky | |
| 6,556,217 B1 | 4/2003 | Makipaa et al. | |
| 7,065,707 B2 | 6/2006 | Chen et al. | |
| 7,853,871 B2 | 12/2010 | Simons et al. | |
| 7,900,149 B2 | 3/2011 | Hatcher et al. | |
| 8,255,793 B2 | 8/2012 | Chakrabarti et al. | |
| 8,370,342 B1 | 2/2013 | Li et al. | |
| 8,849,725 B2 | 9/2014 | Duan et al. | |
| 2002/0016801 A1 | 2/2002 | Reiley et al. | |
| 2002/0099739 A1 | 7/2002 | Fischer | |
| 2003/0050931 A1 | 3/2003 | Harman et al. | |
| 2003/0236917 A1 | 12/2003 | Gibbs et al. | |
| 2004/0095400 A1 | 5/2004 | Anderson et al. | |
| 2004/0103371 A1 | 5/2004 | Chen et al. | |
| 2005/0195221 A1 | 9/2005 | Berger et al. | |
| 2005/0222981 A1 | 10/2005 | Lawrence et al. | |
| 2006/0149726 A1 | 7/2006 | Ziegert et al. | |
| 2006/0161543 A1* | 7/2006 | Feng et al. ......................... 707/5 |
| 2006/0167857 A1* | 7/2006 | Kraft et al. ........................ 707/3 |
| 2006/0230100 A1 | 10/2006 | Shin et al. | |
| 2006/0282758 A1* | 12/2006 | Simons et al. ................. 715/500 |
| 2007/0083810 A1 | 4/2007 | Scott et al. | |
| 2008/0094420 A1 | 4/2008 | Geigel et al. | |
| 2008/0307328 A1 | 12/2008 | Hatcher et al. | |
| 2009/0083251 A1* | 3/2009 | Sahasrabudhe ........ G06Q 40/06 |
| 2009/0083677 A1* | 3/2009 | Darwish et al. .............. 715/854 |
| 2009/0125397 A1* | 5/2009 | Gomaa ............. G06Q 30/0207 705/14.1 |
| 2009/0177959 A1 | 7/2009 | Chakrabarti et al. | |

(Continued)

OTHER PUBLICATIONS

Xiao, et al. "A Comparative Study on Classifying the Functions of Web Page Blocks", CIKM '06, Arlington, Virginia, Nov. 5-11, 2006, 2 pages.

(Continued)

*Primary Examiner* — Son T Hoang
(74) *Attorney, Agent, or Firm* — Berkeley Law & Technology Group, LLP (57) ABSTRACT

Exemplary techniques are provided which may be implemented using various methods, apparatuses, and/or articles of manufacture to provide or otherwise support segment sensitive query matching based on segmented portions of web pages and/or providing related information for use in information extraction and/or information retrieval systems. In certain example implementations techniques may be provided for determining whether a query match exists between a document and obtained query terms based, at least in part, on labeled portion information associated with a plurality of segmented portions of a document.

16 Claims, 4 Drawing Sheets

(56) References Cited

U.S. PATENT DOCUMENTS

| | | |
|---|---|---|
| 2010/0228738 A1* | 9/2010 | Mehta et al. ............... 707/748 |
| 2010/0312728 A1 | 12/2010 | Feng et al. |
| 2011/0035345 A1 | 2/2011 | Duan et al. |
| 2011/0035374 A1 | 2/2011 | Vadrevu et al. |

OTHER PUBLICATIONS

Cai, et al. "Block-based Web Search", SIGIR '04, Sheffield, South Yorkshire, UK, Jul. 25-29, 2004, 8 pages.
Song, et al. "Learning Block Importance Models for Web Pages", WWW 2004, New York, NY, May 17-22, 2004, pp. 203-211.
Song, et al. "Learning Important Models for Web Page Blocks based on Layout and Content Analysis", SIGKDD Explorations, vol. 6, issue 2, Dec. 2004, pp. 14-23.
U.S. Appl. No. 12/538,711; Non-Final Office Action mailed Mar. 26, 2014, 15 pages.
U.S. Appl. No. 12/538,776, filed Aug. 10, 2009, 67 Pages.
U.S. Appl. No. 12/538,776: Filing Receipt, Mailed Aug. 21, 2009, 3 Pages.
U.S. Appl. No. 12/538,776: Notice of Publication, Mailed Feb. 10, 2011, 1 Page.
U.S. Appl. No. 12/538,776: Non-Final Rejection, Mailed May 7, 2012, 16 Pages.
U.S. Appl. No. 12/538,776: Amendment/Req. Reconsideration-After Non-Final Reject, Filed Sep. 6, 2012, 18 Pages.
U.S. Appl. No. 12/538,776: Final Rejection, Mailed Sep. 20, 2012, 12 Pages.
U.S. Appl. No. 12/538,776: Response After Final Action, Filed Nov. 20, 2012, 14 Pages.
U.S. Appl. No. 12/538,776: Advisory Action (PTOL-303), Mailed Nov. 28, 2012, 4 Pages.
U.S. Appl. No. 12/538,776: Request for Continued Examination (RCE) and Amendment, Filed Jan. 22, 2013, 14 Pages.
U.S. Appl. No. 12/538,776: Non-Final Rejection, Mailed Apr. 22, 2013, 15 Pages.
U.S. Appl. No. 12/538,776: Amendment/Req. Reconsideration-After Non-Final Reject, Filed Aug. 22, 2013, 14 Pages.
U.S. Appl. No. 12/538,776: Final rejection, Mailed Oct. 3, 2013, 25 Pages.
U.S. Appl. No. 12/538,776: Request for Continued Examination (RCE) and Amendment, Filed Jan. 3, 2014, 16 Pages.
U.S. Appl. No. 12/538,776: Notice of Allowance and Fees Due (PTOL-85), Mailed Jan. 24, 2014, 5 Pages.
U.S. Appl. No. 12/538,776: Notice of Allowance and Fees Due (PTOL-85), Mailed Apr. 18, 2014, 5 Pages.
U.S. Appl. No. 11/971,160, filed Jan. 8, 2008, 48 Pages.
U.S. Appl. No. 11/971,160: Filing Receipt, Mailed Jan. 28, 2008, 3 Pages.
U.S. Appl. No. 11/971,160: Notice of Publication, Mailed Jul. 9, 2009, 1 Page.
U.S. Appl. No. 11/971,160: Non-Final Rejection, Mailed Mar. 15, 2011, 16 Pages.
U.S. Appl. No. 11/971,160: Amendment/Req. Reconsideration-After Non-Final Reject, Filed Jul. 11, 2011, 23 Pages.
U.S. Appl. No. 11/971,160: Non-Final Rejection, Mailed Sep. 29, 2011, 17 Pages.
U.S. Appl. No. 11/971,160: Amendment/Req. Reconsideration-After Non-Final Reject, Filed Dec. 23, 2011, 23 Pages.
U.S. Appl. No. 11/971,160: Final Rejection, Mailed Feb. 24, 2012, 15 Pages.
US App. 11/971,160: Response After Final Action, Filed 4/24/12, 7 Pages.
U.S. Appl. No. 11/971,160: Notice of Allowance and Fees Due (PTOL-85), Mailed Apr. 30, 2012, 6 Pages.
U.S. Appl. No. 11/971,160: Issue Fee Payment (PTO-85B), Mailed Jul. 24, 2012, 1 Page.
U.S. Appl. No. 11/971,160: Issue Notification, Mailed Aug. 8, 2012, 1 Page.
Cheng, "Design and Realization of Advertisement Promotion Based on the Content of Webpage", KSEM 2007, LNAI 4798, pp. 502-507, 2007, Springer-Verlag Berlin Heidelberg 2007.
Cho et al, "Estimating Frequency of Change", ACM Transactions of Internet Technology, vol. 3, No. 3, Aug. 2003, pp. 256-290.
Douglis et al, "Rate of Change and other Metrics; a Live Study of the World Wide Web", USITS'97, USENIX Symposium on Internetworking Technologies and Systems, Dec. 1997 (13 pgs).
Santini, "Automatic Genre Identification; Towards a Flexible Classification Scheme", BCS IRSG Symposium; Future Directions in Information Access—FDIA 2007, teaches confidence measure. (6 pgs).
Baluja, "Browsing on Small Screens: Recasting Web-Page Segmentation into an Efficient Machine Learning Framework", International World Wide Web Conference, WWW 2006, May 23-26, 2006, Edinburgh, Scotland (10 pgs).
Debnath et al, "Automatic Identification of Informative Sections of Web Pages", IEEE Transactions on Knowledge and Data Engineering, vol. 17, No. 9, Sep. 2005.
Liu et al, "Towards Building Logical Views of Websites", Data & Knowledge Engineering—Special issue: WIDM 2002, vol. 49 Issue 2, May 2004 (32 pgs).
Xu et al, "Extracting Precise Link Context Using NLP Parsing Technique", Proceedings of the IEEE/WIC/ACM International Conference on Web Intelligence (WI'04), Publication Year: 2004, (7 pgs).
Krupl et al, "Using Visual Cues for Extraction of Tabular Data from Arbitrary HTML Documents", WWW2005, May 10-14, 2005, Chiba, Japan (2 pgs).
Vedeshin, "Advanced Information Retrieval from Web Pages", BCS IRSG Symposium: Future Directions in Information Access (FDIA 2007) (6 pgs).
Vadrevu, Srinivas, et al., "Semantic Partitioning of Web Pages", Springer Verlag Heidelberg, 2005, 12 pages.
Chen, Jinlin, et al., "Function based Object Model Towards Website Adaption", Microsoft Research China, WWW10, May 2001, ACM, 15 pages.
Zou, Jie, et al., "Combining DOM Tree and Geometric Layout Analysis for Online Medical Journal Article Segmentation", ACM, JCDL, 2006 10 pages.
Cai, Deng et al., "VIPS:A Vision-based Page Segmentation Algorithm", Microsoft Corporation, Nov. 2003, Technical Report MSR-TR-2003-79, 29 pages.
Kao, Hung-Yu, et al., "WISDOM: Web Intrapage Informative Structure Mining based on Document Object Model", IEEE Transactions on Knowledge and Data Engineering, vol. 17, No. 5, May 2005, 14 pages.
U.S. Appl. No. 14/480,528, filed Sep. 8, 2014, 59 pages.
U.S. Appl. No. 14/480,528: Filing Receipt, mailed Sep. 16, 2014, 3 pages.
U.S. Appl. No. 14/480,528: Notice to File Missing Parts, mailed Sep. 16, 2014, 2 pages.
U.S. Appl. No. 14/480,528: Response to Pre-Exam Formalities Notice, filed Nov. 17, 2014, 2 pages.
U.S. Appl. No. 14/480,528: Filing Receipt, mailed Nov. 21, 2014, 3 pages.
U.S. Appl. No. 14/480,528: Non-Final Rejection, mailed Jul. 30, 2015, 20 pages.

* cited by examiner

SEGMENT SENSITIVE QUERY MATCHING

RELATED PATENT APPLICATIONS

This Patent Application is related to co-pending U.S. patent application Ser. No. 11/971,160, filed Jan. 8, 2008, titled "Automatic Visual Segmentation of WebPages", and which is incorporated by reference herein.

This Patent Application is related to co-pending U.S. patent application Ser. No. 12/538,776, filed Aug. 10, 2009, titled "Automatic Classification of Segmented Portions of Web Pages", and which is incorporated by reference herein.

BACKGROUND

1. Field

The subject matter disclosed herein relates to data processing.

2. Information

Data processing tools and techniques continue to improve. Information in the form of data is continually being generated or otherwise identified, collected, stored, shared, and analyzed. Databases and other like data repositories are common place, as are related communication networks and computing resources that provide access to such information.

The Internet is ubiquitous; the World Wide Web provided by the Internet continues to grow with new information seemingly being added every second. To provide access to such information, tools and services are often provided which allow for the copious amounts of information to be searched through in an efficient manner. For example, service providers may allow for users to search the World Wide Web or other like networks using search engines. Similar tools or services may allow for one or more databases or other like data repositories to be searched.

With so much information being available, there is a continuing need for methods and apparatuses that allow for relevant information to be identified and presented in an efficient manner.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Some exemplary methods and apparatuses are described herein that may be used for segment sensitive query matching relating to classified (labeled) segmented portions of one or more displayed web pages.

Before describing some example methods and apparatuses in greater detail, the sections below will first introduce certain aspects of an exemplary computing environment in which information searches may be performed. It should be understood, however, that techniques provided herein and claimed subject matter are not limited to these example implementations. For example, techniques provided herein may be adapted for use in a variety of information processing environments, such as, e.g., database applications, etc.

The Internet is a worldwide system of computer networks and is a public, self-sustaining facility that is accessible to tens of millions of people worldwide. Currently, the most widely used part of the Internet appears to be the World Wide Web, often abbreviated "WWW" or simply referred to as just "the web". The web may be considered an Internet service organizing information through the use of hypermedia. Here, for example, the HyperText Markup Language (HTML) may be used to specify the contents and format of a hypermedia document (e.g., a data file, a web page).

Unless specifically stated, a data file such as an electronic or web document refers to an electronic representation of source code and/or any other data that may be accessed and processed in some manner to establish, render, and/or otherwise display a particular web page. Such a web page may contain embedded references to images, audio, video, other web documents, etc. One common type of reference used to identify and locate resources (such as a web document) on the web is a Uniform Resource Locator (URL).

In the context of the web, a user may "browse" for information by following references that may be embedded in documents, for example, using hyperlinks provided via the HyperText Transfer Protocol (HTTP) or other like protocol.

Through the use of the web, individuals may have access to millions of pages of information. However, because there is so little organization to the web, at times it may be extremely difficult for users to locate the particular pages that contain the information that may be of interest to them. To address this problem, a mechanism known as a "search engine" may be employed to index a large number of web pages and provide an interface for use in searching the indexed information, for example, by entering certain words or phrases to be queried.

A search engine may be used to process digital signals representative of and/or otherwise associated with web documents. For example, a search engine may provide or otherwise employ on a "crawler" (also referred to as "crawler", "spider", "robot") that may "crawl" the Internet in some manner to locate such digital signal information (e.g., web documents). Upon locating a web document, the crawler may store digital signals relating to the document's URL, and possibly follow any hyperlinks associated with the web document to locate other web documents.

A search engine may, for example, include digital signal information extraction and/or indexing mechanisms adapted to extract and/or otherwise index certain digital signal information about the web documents that were located by the crawler. Such digital signal index information may, for example, be generated based on the contents of an HTML file associated with a web document. A digital signal indexing mechanism may store digital signal index information in a memory mechanism, e.g., as part of a database.

A search engine may provide a search tool that allows users to search the database. The search tool may include a user interface to allow users to input or otherwise specify search terms (e.g., keywords or other like criteria) and receive and view search results. Such inputs and results may be represented by digital signals. A search engine may present the search results in a particular order, for example, as may be indicated by a ranking scheme. For example, the search engine may present an ordered listing of search result summaries in a search results display. A search result summary may, for example, include digital signal information about a website or web page such as a title, an abstract, a link, and possibly one or more other related objects such as an icon or image, audio or video information, computer instructions, or the like.

One or more data files represented by digital signals may be processed (e.g., rendered) to transform such digital signals into corresponding digital and/or analog signals for use in visually displaying (and possibly audibly reproducing) content information associated with the web page. It should be understood that the term "content information" as used herein may include digital signals and/or corresponding analog signals that are, at least in part, representative and/or otherwise communicative of data that may be transformed and/or otherwise processed in some manner to render and/or otherwise display and/or reproduce content for consumption (e.g., viewing, listening) and/or subsequent interaction by a user. As is known, digital signals may be converted to analog signals, and vice versa. As is known, such digital signals may be written to, stored in and read from a memory.

With this in mind, a displayed web page may include various types of content information, some of which may be of more or less interest to a viewer. By way of example but not limitation, in addition to providing intended "main" content information, a displayed web page may also include other "supportive" content information, e.g., web page or website navigation information such as selectable links, branding information such as iconic images, copyright and/ or other like disclaimer information, and/or other like information that may be associated with a web page/site, an entity associated with the web page, and/or the main content. A web page, for example, often includes supportive content information in the form of advertisements and/or other like promotional content that may be considered of potential interest to a viewer. Banner advertisements and/or the like, for example, may be included in a displayed web page in a manner that allows for viewer selective interaction.

Of course, there may be significant differences in how such "main" and "supportive" content information may be specified within one or more data files associated with a web page and/or website. There may also be significant differences in how "main" and "supportive" content information are visually arranged in a displayed web page upon rendering.

With this in mind, techniques are presented herein in which "labeled portion information", for example, represented by digital signals stored in memory as part of a search index may be used to provide segment sensitive query matching. Such labeled portion information may be associated with segmented portions of a displayed web page that have been identified and classified in some manner. In particular implementations, such techniques may, for example, allow for improved and/or otherwise more efficient searching based on type, quality, etc., of content information within such segmented portions and/or web pages. For example, certain types of segmented portions may be of more interest to a viewer, and hence more relevant to a search or other like retrieval or data mining function than other portions within a web page.

Figure 1:
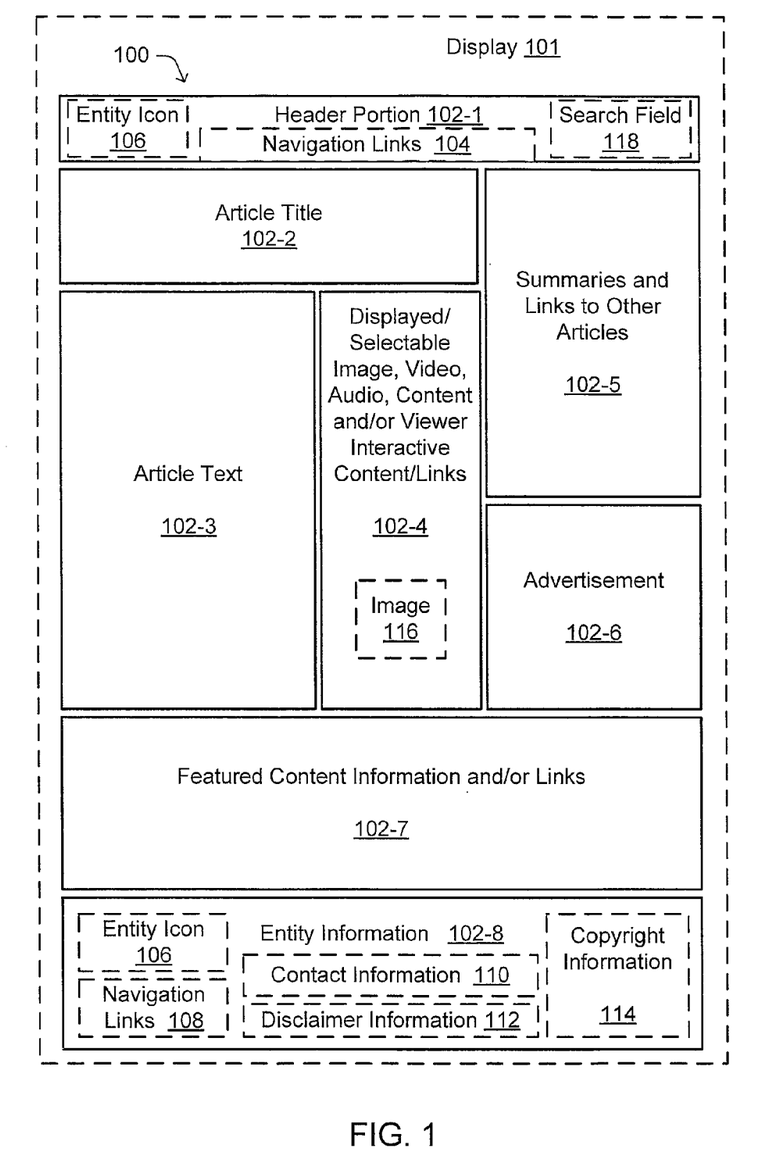
FIG. 1 is an illustrated representation of a displayed web page having an organization in which portions of a displayed/displayable web page may be identified and classified and/or otherwise labeled in some manner as segmented portions, in accordance with certain example implementations.

Attention is now drawn to FIG. 1, which is an illustrated representation of a web page 100 as displayed (displayable) using a display device 101. As shown, displayed web page 100 has a layout as might be of use to a news agency. Here, by way of example but not limitation, web page 100 may include various sections, etc., that may be identified as segmented portions 102. Here, for example, some initial segmented portions may include a header portion 102-1, which may include one or more web site navigation links 104, an entity icon 106, a search field 118 (e.g., associated with a user interface), and/or other like content (not shown). An article title portion 102-2 may be provided along with an article text portion 102-3. Another content portion 102-4 may be provided that includes displayed/selectable image, video, audio, and/or certain interactive content/links, which may or may not be associated with article text portion 102-3. In certain examples, an image 116 and/or other like content may be included which may be related to article text portion 102-3. In another content portion 102-5, summaries and links to other (possibly related) articles may be presented. A content portion 102-6 may be provided in which advertisement content information is presented. Another content portion 102-7 may include other featured content information and/or links. As shown in this example, another content portion 102-8 may be included in the web page to provide additional information to the viewer (e.g., user) with regard to the web page, website, entity, etc. Here, for example, entity information may include an entity icon 106, navigation link(s) 108, contact information 110, declaimer information 112, copyright information 114, and/or other like content information (not shown).

In this illustrated example, having identified the various segmented portions (e.g., using a segmenter and/or other like process), the identified segmented blocks may be classified in some manner. For example, certain segmented portions, such as, e.g., 102-2, 102-3 and 102-5 may be classified as representing a particular segment type, which may be in some manner different from the remaining segmented portions. More specifically in the example context of the news agency web page, sections relating to the article title (identified as segmented portion 102-2), article text (identified as segmented portion 102-3), and summaries and links to other articles (identified as segmented portion 102-5) may, for example, be classified as of a type representing "main" content information. The remaining segmented portions may, for example, be classified as of a type representing "supportive" content information. Of course, this is just an example to which claimed subject matter is not limited.

Figure 2:
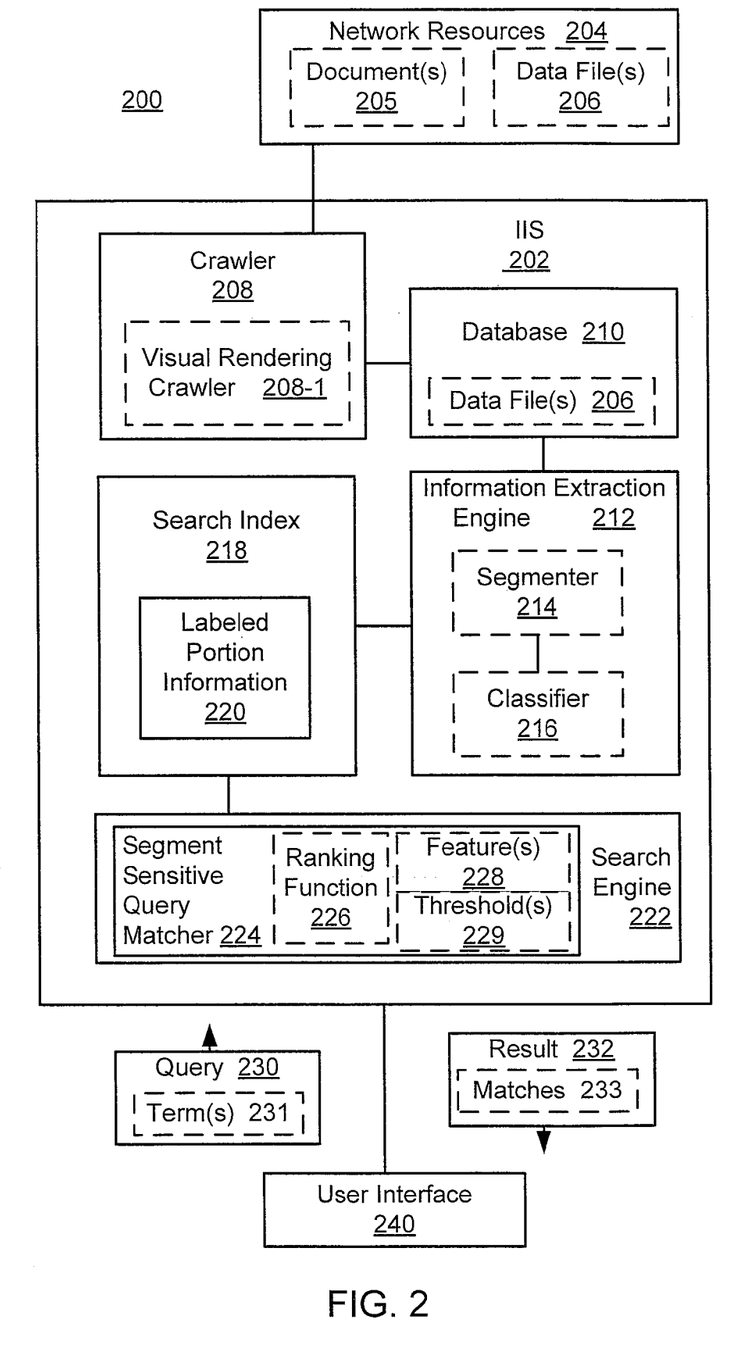
FIG. 2 is a schematic block diagram illustrating certain functional features of an example data processing environment including an information integration system that may be operatively enabled to perform query matching and/or other like processes based, at least in part, on one or more segmented portions of one or more web pages, for example, as in FIG. 1, in accordance with certain example implementations.

With the non-limiting example of FIG. 1, in mind, attention is drawn next to FIG. 2, which illustrates certain functional features of an example data processing environment 200 that may be operatively enabled to perform query matching and/or other like processes based, at least in part, on one or more segmented portions of one or more web pages, in accordance with certain example implementations.

It should be understood that, as with the other examples presented herein, data processing environment 200 is also a non-limiting example implementation. Data processing environment 200 may, for example, be operatively enabled using one or more computing devices (e.g., special purpose computing device), one or more data storage devices, one or more data communication devices, one or more computer readable media, computer instructions, computer applications and/or tools, various circuitry, and/or input data, as described herein in particular example implementations.

As shown, computing environment 200 may, for example, include an Information Integration System (IIS) 202. Here, for example, IIS 202 may include a search engine 222 that may include and/or otherwise being operatively coupled to a segment sensitive query matcher 224.

IIS 202 may include a crawler 208 that may be operatively coupled to network resources 204, which may include, for example, the Internet and the World Wide Web (WWW), one or more servers, etc. Crawler 208 may, for example, include and/or otherwise being operatively coupled to a visual rendering crawler 208-1 to identify and/or otherwise consider displayed/displayable portions of web pages (e.g., documents 205) in identifying at least a portion of the data file(s) 206, which may be represented using one or more digital signals from one or more network resources 204 and/or otherwise stored in memory (e.g., a database 210 and/or the like). Data files 206 may, for example, be represented by one or more digital signals related to one or more displayable web pages and content information therein. Such data files may include digital signals stored in a data storage device (e.g., memory). A document 205 may, for example, comprise one or more data file(s) 206 associated with a web page that may be displayed.

As shown in this example, IIS 202 may include an information extraction engine 212, which may include and/or otherwise being operatively coupled to a segmenter 214 and/or a classifier 216.

Segmenter 214 may, for example, access digital signals representing data files 206 and based, at least in part thereon, identify various segmented portions in one or more displayed web pages. Segmenter 206 may be enabled to automatically identify one or more segmented portions, for example, based, at least in part, on one or more properties.

Classifier 216 may, for example, classify and/or otherwise label in some manner one or more of the segmented portions to establish digital signals representing labeled portion information 220. Classifier 216 may, for example, be enabled to classify segmented portions based, at least in part, on one or more machine learned models (e.g., statistical and/or rule based, etc.) and/or one or more identifiable and/or inferable feature properties. All or part of labeled portion information 220 may, for example, be stored in memory as part of a search index 218.

As further shown in this example implementation, IIS 202 may include search engine 222. Search engine 222 may, for example, access digital signals representing at least a portion of labeled portion information 220. Search engine 222 may, for example, include and/or otherwise be operatively coupled to a segment sensitive query matcher 224.

Search engine 222 may, for example, be operatively enabled to communicate using digital signals that are transmitted and received via one or more communication links (e.g., via a communications network) with a user interface 240. Here, for example, user interface 240 may initiate and/or otherwise enable the transmission of one or more digital signals representing a query 230, e.g., having one or more query terms 231. Search engine 222 may, for example, obtain (e.g., receive, access, etc.) query 230 and initiate and/or otherwise enable a search process based, at least in part, on at least a portion of the information represented by one or more digital signals of query 230. Here, for example, search engine 222 may initiate and/or otherwise enable a process for performing query matching based, at least in part, on one or more segmented portions of one or more web pages. An example implementation of a process for performing query matching is described in greater detail below with regard to FIG. 3.

During and/or following a query matching process, search engine 222 may initiate and/or otherwise enable transmission of one or more digital signals representing at least a portion of the results 232 of the query matching process. User interface 230 may, for example, present at least a portion of results 232 and/or otherwise establish a presentation of one or more matches 233 based, at least in part, on results 232, which a user may view.

In certain example implementations, crawler 208 may be adapted to locate data files associated with web pages. Crawler 208 may also follow one or more hyperlinks associated with the page to locate other web pages. Upon locating a web page, crawler 208 may, for example, store the web page's URL and/or other information in database 210. Crawler 208 may, for example, store an entire web page (e.g., data files comprising HTML, XML, or other like code, content, etc.) and URL in database 210.

Search engine 222 may, for example, be used to help index and/or otherwise search for content that may appear in web pages. Search engine 222 may be used in conjunction with user interface 240, for example, to retrieve and present search results associated with search index 218. The information associated with search index 218 may, for example, be generated by information extraction engine 212 based on extracted content of an HTML file associated with a respective web page.

While not intended to limit claimed subject matter herein, in related, co-pending U.S. patent application Ser. No. 11/971,160, filed Jan. 8, 2008, titled "Automatic Visual Segmentation of WebPages", some example techniques are described which may be used to identify segmented portions in web pages. Further, in related, co-pending U.S. patent application Ser. No. 12/538,776, filed Aug. 10, 2009, titled "Automatic Classification of Segmented Portions of Web Pages", some example techniques are described which may be used to automatically classify and index segmented portions of web pages (e.g., by predicting segment quality scores ranging on a discrete scale from noise to main content).

In certain example implementations, labeled portion information 220 may include, for example, digital signals stored in memory that represent enriched information regarding at least one segmented portion, such as, a content quality grade, score and/or the like, which may range on a discrete scale from classifying the segmented portion as main content information to supportive content information (e.g., noise). In certain implementations, for example, one or more discrete scales may be employed which has only a few discrete values as in classification, while in other implementations one or more discrete scales may be employed which includes a significant number of discrete values to provide a quantized approximation to a continuous value. As described in greater detail below, segment sensitive query matcher 224 may be implemented using various methods and/apparatuses to possibly improve and/or otherwise affect query matching to web pages by considering all or part of labeled portion information 220 (e.g., a content quality score) relating to segmented portions of a web page. By way of example but not limitation, techniques may be implemented to improve and/or otherwise affect one or more term frequency components considered by a ranking function 226 which may be included within and/or otherwise operatively coupled to search engine 222. Here, for example, one or more ranking features 228 may be provided. Such techniques may, for example, provide for the use of one or more nonlinear query matching features (nonlinear features).

Some known information retrieval functions, such as, for example, BM25F are frequently used as one of a plurality of components in web search ranking functions. This and other like information retrieval functions are usually based on term frequency, in other words the frequency of a query term in a candidate document, as a basic unit of information. In certain databases where a document model has a single body section, the term frequency may be obtained, for example, by considering contributions from multiple instances of a query match within the document body. In certain situations, this may unduly inflate the value of a match by counting occurrences that may be considered to represent "noise" in the document (e.g., something other than main content information). Furthermore, term frequency is often normalized by a length of a document section. In the case where a document model has a single body section, such normalization may be based, therefore, on the document's full length. Thus, in certain instances the effectiveness and/or efficiency of a query match and/or search engine may be reduced or otherwise affected in some manner. For example, the effectiveness and/or efficiency of a query match may be affected by unduly reducing an emphasis on significant matches if a document has multiple main content blocks and perhaps only one is significantly relevant for retrieval. This may occur, for example, in web pages that include long documents like FAQs, forums, blogs, and/or the like. Additionally, some information retrieval functions may assume term independence, which may also impact the effectiveness and/or efficiency of a query match and/or search engine, since different query terms may match unrelated portions in the document.

In accordance with one aspect of the present description, labeled portion information 220 may include or otherwise relate content quality scores for segmented portions. As described herein, for example, content quality scores may be used by segment sensitive query matcher 224 and/or other like information retrieval function(s) to support matching processes based on term frequency and/or section lengths. As described herein, for example, content quality scores may be used by segment sensitive query matcher 224 and/or other like information retrieval function(s) to establish one or more nonlinear features of and/or otherwise relating to query match quality.

In certain example implementations, term frequency may be determined over a single body section based, at least in part, on a weighted sum of term frequencies calculated for segmented portions in the body using the segments true length rather than the document's length. The weights used may, for example, be based, at least in part, on the content quality scores for the segmented portions of the document.

In certain implementations, for example, segment sensitive query matcher 224 may provide identity mapping based, at least in part, on content quality scores as weights. In certain implementations, for example, segment sensitive query matcher 224 may be enabled to provide a weight transformation based, at least in part, on a quantizing step function yielding a discrete number of weight profiles. Here, for example, if there is only one step in such function then a result is a binary weight. For example, a binary weight may be obtained by comparing continuous or discrete content quality scores with a threshold parameter 229. Once a weighted term frequency has been determined, then an information retrieval function may be readily established using one or more known techniques, such as, for example, BM25F and/or the like.

In certain implementations, for example, segment sensitive query matcher 224 may be enabled to establish and/or otherwise consider one or more nonlinear query match quality measures based, at least in part, on joint counts of query terms in various content quality scores. Here, for example, content quality scores may be compared to a threshold parameter 229 to establish a main content type or a noise type. Some examples of joint counts include the following: an exclusive match in supportive content segmented portions (e.g., a match exists if query terms occur in a single noise segment); and a content match (e.g., a match exists if query terms occur in at least in one of the main content segmented portions). Certain example nonlinear query match quality measures may include those based, at least in part, on treating segmented portions as nodes on a graph model of a document (e.g., web page). Some examples that may be obtained if such a graph is fully connected include: a "query segment cover", wherein a specified number of segmented portions cover all terms in a query; and a "query content cover", wherein a specified level of content quality score covers all query terms.

In accordance with certain aspects, longer queries (e.g., that contain multiple entities or entities and facets) may prove difficult for traditional query matching methods that treat the body of a web page as a uniform section. Web page content is often organized in several semantically coherent portions, and ignoring such may lead to spurious matches that find one part of the query in one portion and another related part in another possibly significantly unrelated block. The techniques presented herein may be implemented to reduce such faulty matches. By way of example but not limitation, in certain offline simulations/experiments, it appeared that an example segment sensitive query matcher and/or search engine using a combination of segment weighted BM25F features along with certain nonlinear features may prove beneficial in handling such difficult queries.

With the various examples above in mind, an example model will now be described in greater detail, which may be implemented in whole or part in data processing environment 200. Here, by way of example but not limitation, certain example Page Segment Content Quality (PSCQ) models are presented which may be utilized for improving query matching, web searching, and/or the like.

In this example, BM25F serves as a baseline text matching feature and a segment weighted version of it is established to illustrate PSCQ's application to ranking models. One or more other functions may be used as a baseline, here since BM25F and its variants are well known it is a reasonable choice to serve as a strong reproducible baseline.

The BM25 with field weighting and per-field length normalization, also referred as BM25F is popular given, for example, its robustness in query matching and handling of multiple fields such as body, anchor text, title and URL in a document. In the BM25F formulation, a normalized term frequency for a field is given by the following formula:

$$\bar{g}(t, D, f) = \frac{g(t, D, f)}{\left(1 + B_f\left(\frac{|f|}{avgfl} - 1\right)\right)} \quad (1)$$

where t is a term in a field f in a document D, |f| is a length of the field in words, avgfl is an average field length (e.g., avg(fl)) in a text collection from which documents are drawn. $B_f$ is a field-independent free parameter that may be tuned, for example, similar to a B parameter in a BM25 formulation. Here, g(t,D,f) is the raw term frequency of term t in the field f of document D and $\bar{g}$(t,D,f) is a normalized term frequency, normalized with average field length.

A term frequency across multiple fields may be combined linearly with a weight for each field, to obtain a weighted term frequency, $\bar{g}$(t,D) across an entire document, as:

$$\bar{g}(t, D) = \sum_{f_i} W_{f_i} \cdot \bar{g}(t, D, f_i) \quad (2)$$

where $W_{f_i}$ is a weight given to field $f_i$ of the document D. A final BM25F function may, for example, be computed with a term saturating factor and an inverse document frequency (IDF) as:

$$BM25F(D) = \sum_{t_i \in q} IDF(t_i) \cdot \frac{\bar{g}(D, t_i)}{K_1 + \bar{g}(D, t_i)} \quad (3)$$

where $K_1$ is the term saturating factor and Inverse Document Frequency (IDF) may be defined as:

$$IDF_s(t_i) = \log\frac{N - n(t_i) + 0.5}{n(t_i) + 0.5} \quad (4)$$

where N is a total number of documents in the collection and $n(t_i)$ is a corpus frequency of $t_i$, e.g., a number of documents in which $t_i$ appears.

Although BM25F has proven to be a very useful feature in certain ranking models, BM25F may be disadvantaged at times as it treats the entire body of a web page as a single field and each segment within the body contributes equally to the overall BM25F feature.

Segment sensitive query matcher 224, search engine 222 and/or other like function may, for example, implement in whole or part an alternate version of BM25F formulation that considers segments (segmented portions) inside a web page as separate document fields in the original formulation and weighs individual segments in the web page according to PSCQ scores of the individual segments. In certain example implementations, it may be that the only change in an implemented BM25F formulation is that the whole body of the document which is originally a single field is split into multiple fields based on segmented portions in the document. Thus, consider:

$$\bar{g}(t, D, f_b) = \sum_{i=1}^{k} w(S_i) \cdot \bar{g}(t, D, f_b, S_i) \quad (5)$$

$$\bar{g}(t, D, f_b, S_i) = \frac{g(t, D, f_b, S_i)}{\left(1 + B_{f_b}\left(\frac{|S_i|}{avgsl} - 1\right)\right)} \quad (6)$$

where k is the number of segments in document D and $w(S_i)$ is the PSCQ score of the segment $S_i$ in the document D. Here, for example, the higher $w(S_i)$ is, it may be more likely that a segmented portion includes main content as opposed to be noise. $|S_i|$ is the length of the segment $S_i$ in words, avgfl is the average length of the segment in the collection. Here, g(t,D, $f_b$, $S_i$) is a raw term frequency of t in the segment $S_i$ in the body field $f_b$ in the document D, and $\bar{g}$(t,D, $f_b$,$S_i$) is the average segment length normalized term frequency. Here, $\bar{g}$(t,D, $f_b$) is used in the computation of $\bar{g}$(t,D) in equation (2) of a BM25F formulation where $f_b$ is one of the fields.

In certain example implementations, while such a PSCQ based BM25F formulation may be enabled to consider segment content quality in computing a text match score, it may also be further enhanced to account for certain shortcomings of the linear formulation using segment quality scores as weights. As such, segment sensitive query matcher 224, search engine 222 and/or other like function may, for example, implement in whole or part a set of nonlinear PSCQ text matching features, which may, for example, be based at least in part on the page segment content quality predictions. In certain implementations, one or more nonlinear features may also depend on a query match score and/or the like of segments and/or segment graph as described earlier in relation to a query match cover While an enhanced BM25F formulation, for example as described above, may use a prediction of segment content quality classifier in range as segment weights, binary segment content quality predictions may be used for considering certain nonlinear features. Here, for example, segment weights may be converted into binary segment labels by using a defined threshold parameter 229. Such a threshold parameter 229 may, for example, be determined experimentally and pre-defined, and/or otherwise dynamically defined in some manner. By way of example but not limitation, in certain simulations, a threshold parameter of 0.5 was used, such that a segmented portion with a prediction score greater than 0.5 would be labeled as a content segment and other segments labeled as noise segments. In certain implementations, for example, stopwords may be eliminated from a query before certain PSCQ features are computed. By way of example, stopwords may include terms that occur frequently in various contexts and therefore may not necessarily provide valuable semantic clues. Usually, a small set of such terms (e.g., including the articles "a", "and", "the", etc.) may be omitted from queries when a matching score is evaluated. In certain implementations, one or more nonlinear PSCQ features may, for example, depend on a query match score of segments as well as the segment weights and segment graph. Here, for example, a query match score may include a simple term frequency or perhaps a more complex model such as BM25F.

One nonlinear feature may be used, for example, to attempt to handle spurious query matches which may occur in noise segmented portions of a web page by explicitly down-weighting such query matches in a noise portion of the web page. Here, for example, such Boolean feature may be a "1" when the query terms appear in a single noise segment in the web page. With the absence of content quality models, such a match in a noise segment may be excellent because the query terms are present in close proximity to each other in the web page. However, with an enhanced BM25F formulation if such match occurs within a noise segment then such result may be down-weighted in some manner.

Another nonlinear feature may be used, for example, which is an inversion to nonlinear feature above, in which a Boolean feature that is "1" if all query terms occur in at least in one main content segmented portion. Here, for example, such a nonlinear feature may be used to ensure that none of the query terms exclusively appear in supportive (noise) segmented portions. To demonstrate a spurious query match that this feature handles, consider a query 'bash join' where the user is looking for information on a join operation in bash shell in UNIX. Without the presence of content quality models, e.g., in segment sensitive query matcher 224, a search engine may fetch a bash community web page that talks about joining the mailing lists for bash. By enforcing that query terms occur in at least one main content segmented portion, such spurious matches may be reduced or eliminated by segment sensitive query matcher 224.

Another potentially useful nonlinear feature may be a query segment cover size, which may include a minimum or otherwise specified number of segments that are to cover all query terms. Here, for example, a document that captures query terms in a semantically coherent segmented portion may be more relevant than a document where query terms are scattered in several segmented portions. For queries with generic terms, such as 'best tech documents', there may be a risk for spurious matches which may occur in various positions in a displayed web page. Here, for example, with segment sensitive query matcher 224 one or more such matches may be down-weighted because generic terms are likely to match arbitrarily in independent segments. In certain implementations, if semantic coherence is a strong consideration or constraint in the web page segmentation process then, if all query matches are found in one segmented portion it is likely that such matches are related. Thus, such a query segment cover size feature may be used as a proximity feature for query matching. By way of example, a query segment cover size may represent a specific and/or minimum number of segment graph edges needed to traverse in order to observe all query terms. A weighted version may, for example, be used where weights of the segments that are members of the cover are summed. Such version of the feature may, for example, provide more importance to query matches in a reduced number of potentially important high quality segments.

Another potentially useful nonlinear feature may be a lowest content quality score, which may be desired to cover all query terms. Here, for example, a lowest content quality score feature may indicate how deep one has to traverse into the noise segmented portions of a web page in order to obtain a desired level of cover for the query. Thus, if one of the query terms may only be found in a noise segmented portion (e.g., having with low content quality score), then it may be considered to be a poor match. For example, if a query is 'California home prices', any web page that has the term 'home' only in the navigation bar of the web page may match, although it may not be the primary focus of the content information in web page. Segment sensitive query matcher 224 may, for example, may use a lowest content quality score feature to help identify and/or otherwise reduce the chance of such spurious matches impacting a query match process.

A query matching process that uses a PSCQ based BM25F formulation will now be described by way of example but not limitation. Here, for example, segment sensitive query matcher 224 may implement a PSCQ based BM25F formulation. The example query match is for a query 'best companies to work for'. It will be assumed that such query terms occur in two segment portions of a particular web page, which tends to boost a raw term frequency of the query terms. However, in this example, it is further assumed that the two segmented portions have been classified and labeled via the labeled portion information 220 as being supportive content information (noise). Because the query terms appear twice in the web page the resulting raw term frequency may influence an original BM25F score of a query to document match as the body is an important field in the basic BM25F formulation. In a PSCQ based BM25F formulation, however, the body matches may be further split up into segment weights and since both the segmented portions in which the query are labeled as noise (e.g., having lower content quality scores), a query match may be weighted less with a PSCQ based BM25F formulation. Moreover, one or more of the example nonlinear features may avoid or reduce the chance for a query match in such a situation. For example, as this is an exclusive noise match, there may be no content match for query terms, and/or the lowest content quality score to cover such query terms may not be satisfied. An example nonlinear feature that might favor such a query match is a query segment cover, which may boost a proximity measure of query terms, or a weighted version of a query segment cover size. However, since all other nonlinear/ranking features tend to work against such a query match with this example document, this web page may be ranked lower in the search results 232.

Thus, with a PSCQ based BM25F formulation and use of one or more nonlinear ranking features, segment sensitive query matcher 224 may be used to reduce matching many likely irrelevant web pages by down-weighting query matches with certain document and/or boosting certain documents where the query match occurs with content in segmented portions classified and/or otherwise labeled as of a main content information type.

In certain example implementations, one or more nonlinear features may depend on nonlinear transformations of segment weights (e.g., which may include binary predictions obtained by nonlinear transformation of thresholding), a segment graph (e.g., where a nonlinear transformation may be a minimum spanning tree algorithm selecting certain edges of the graph and setting the rest to zero in the edge matrix of the graph) and query match scores of segments.

In certain example implementations, as described in greater detail below one or more nonlinear features may depend on nonlinear transformations of segment weights (e.g., which may include binary predictions obtained by nonlinear transformation of thresholding), a segment graph (e.g., where a nonlinear transformation may be a minimum spanning tree algorithm selecting certain edges of the graph and setting the rest to zero in the edge matrix of the graph) and query match scores of segments.

By way of illustration, assume that segments of a web page are represented as nodes on a connected graph induced by the underlying Document Object Model (DOM) graph of the page. Here, for example, let:

n be the nodes of the graph corresponding to the segments, represented as a vector of node IDs;

E be the edges of the graph corresponding to parent-child relationships of segments, represented as a matrix where rows and columns correspond to the nodes and the matrix entry is 1 when there is an edge between two nodes and 0 otherwise;

w be the weights corresponding to each segment, represented as a vector with elements in the order of the node ID vector n;

c be the content of segments, represented as a vector where elements are strings containing the text of each segment;

q be the query vector containing vector of strings; and k be the number of query terms.

Here, for example, nonlinear features may be defined in terms of functions or algorithms, where:

m(q,c) is a match between a query and the segments (e.g., vector valued function where each element is the match between the query and the contents of a particular segment $c_i$.). Examples may include: number of query terms found in content of each segment; simple function (e.g. sum) of frequency of each query term in the content of each segment; complex query matching function such as BM25F applied to the content of each segment; and/or the like;

M(q,c) is a match between each query term and the segments (e.g., matrix valued function where each element is the match between a particular query term and the contents of a particular segment). Examples may include: presence or absence of a query term in a segment; count of occurrence of a query term in a segment; presence or absence of a query term in segment conditioned on presence, absence or proximity of another query term; and/or the like;

g(w) provides nonlinear transformations of weights (e.g., vector valued function where each vector element is the scalar transformation of the corresponding segment weight). Examples may include: threshold function producing a binary value; hinge function whose value is 0 if the argument is smaller than a threshold, and it is a linear transformation of the argument otherwise; and/or the like;

f(n,E,g(w),m(q,c), M(q,c)) is a nonlinear scalar valued function or an algorithm producing a scalar value at least in part based on segment graph (e.g., nodes, edges), nonlinear transformation of segment weights and query match. Some further examples beyond those previously described may include: query matching function m returns 1 for a segment if all query terms are present in the content of that segment, 0 otherwise; nonlinear transformation g thresholds segment weights w to produce binary classification of noise (g(w)=0) and main content (g(w)=1); nonlinear feature function f returns 1 if m returned 1 for a segment that g returned 0. in certain examples, $f(n,E,g(w_i),m(q, c_i),M(q, c_i))=1$ if $m(q, c_i)=0$ for a segment i. As previously described, in certain example implementations, a query matching function m returns 1 for a segment if all query terms are present in the content of that segment, 0 otherwise; nonlinear transformation g thresholds segment weights w to produce binary classification of noise (g(w)=0) and main content (g(w)=1); nonlinear feature function f returns 1 if m returned 1 for a segment that g returned 1. In certain examples, $f(n,E,g(w_i),m(q, c_i),M(q, c_i))=1$ if $m(q, c_i)=1$ for a segment I; and f(F(n,E,g(w),m(q,c), M(q,c))) is a nonlinear composite function or algorithm where the operator outside (f) produces a scalar value and the operator inside (F) produces a vector or matrix value at least in part based on segment graph (e.g., nodes, edges), nonlinear transformation of segment weights and query match.

In certain example implementations, a query segment cover may include a query matching function M that is 1 for all query terms and segments if the query term is present in the segment, and 0 otherwise. Here, for example, the algorithm F produces a minimum spanning tree of E' (e.g., removes certain edges in the graph E by setting those values in the edge matrix to zero) such that the nodes of the remaining graph contains each query term at least once. To check if this condition is satisfied, one may marginalize the minimum spanning tree candidate E' by summing its columns and setting all nonzero entries to 1, and then multiplying that column vector from right with the matrix result of M. The resulting row vector is dense (e.g., having no zeros) for the minimum spanning tree E' to be a query segment cover. With this example method to check, one may enumerate all possible connected subgraphs of E, select the subset that qualifies as a query segment cover, and then select the one with the minimum number of edges. Ties at the end may, for example, be broken by randomly selecting one tree.

Thus, for example, an algorithm F may be formulated as follows. A segment cover π is a set of segments, such that it satisfies the following two conditions:

1. $\Sigma_{i=1 \text{ to } k} f(M(q_i, \pi)) \geq k$
   a. where k is the number of terms in query,
   b. $f(M(q_i, \pi))$ is a binary function which outputs 1 if the query term $q_i$ is present in a segment $c_i$ and 0 when it is not present.
   c. This describes that a segment cover should contain all the query terms, at least once.

2. There is no other set of segments π' such that size(π') <size(π), i.e., π is the spanning tree with minimal size in the graph E.

Here, for example, condition 1 implies that the segment cover π is a tree over E, with the segment edges and that π should span across all the query terms. Intuitively this could be thought of as a spanning tree across query terms. Condition 2 emphasizes that this segment cover π is the one with minimal size. These two conditions indicate that there could be multiple sets of segments that satisfy the definition of segment cover.

By way of example, from these sets of segment covers, one may define the following nonlinear features:

3. Segment Cover based nonlinear features:
   a. size(π), e.g., the size of the minimal segment cover
   b. argmax ($\Sigma_{s \in \pi} g(s)$), for each minimal segment cover π, e.g., maximum of the sum of PSCQ weights of the segments in each of the segment covers. Intuitively, this is the maximum total node weight of any of the minimal segment covers.
   c. For each minimal segment cover $\pi_i$, let $\mu_i$=min (g(s)), for each segment s in π, i.e. the minimum node weight in the segment cover. The nonlinear feature can now be defined as max ($\mu_i$), i.e., maximum of the minimum segment weight in each of the segment covers.

Figure 3:
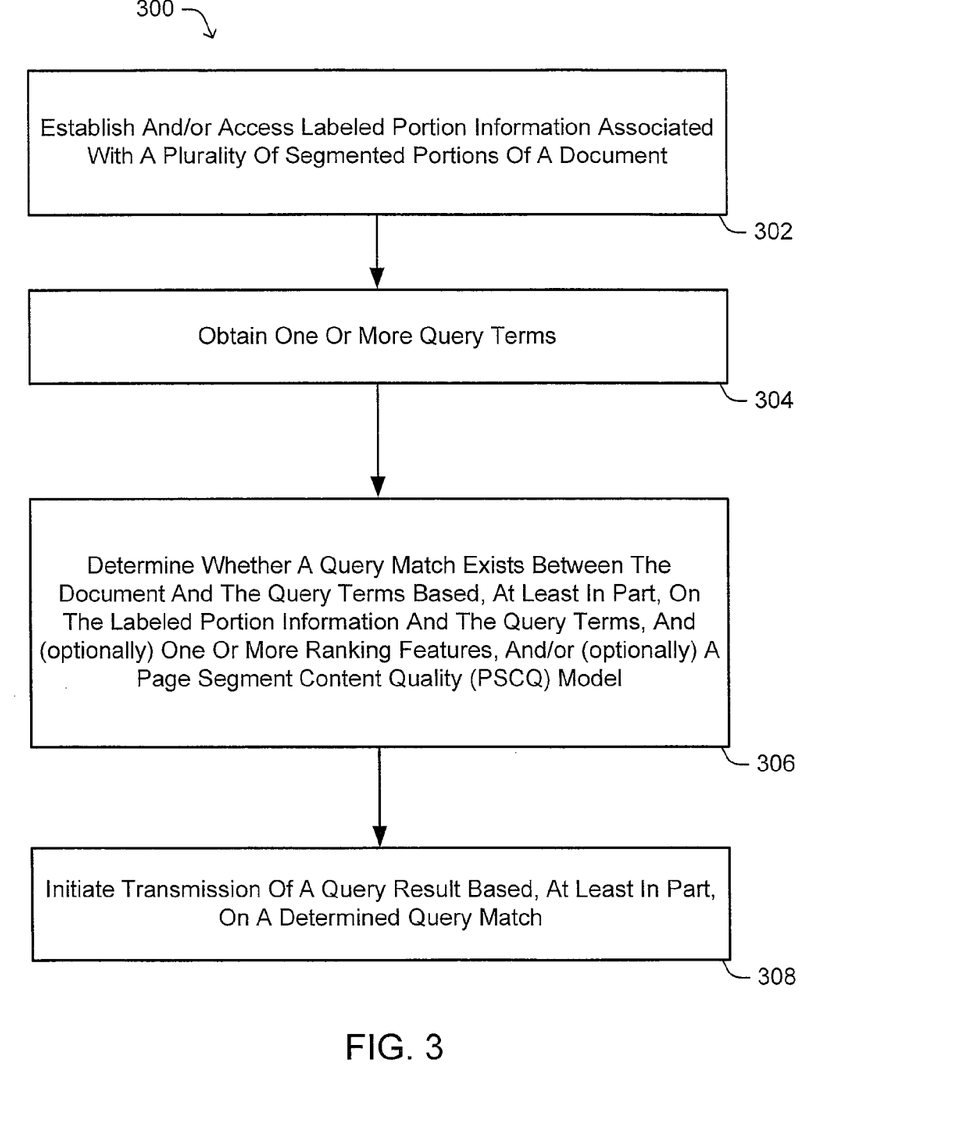
FIG. 3 is a flow diagram illustrating a process for performing query matching based, at least in part, on one or more segmented portions of one or more web pages, for example, as in FIG. 1, in accordance with certain example implementations.

Attention is drawn next to FIG. 3, which is a flow diagram illustrating an example process 300 that may be implemented in whole or part, e.g., in one or more special purpose computing devices, to provide and/or otherwise support segment sensitive query matching. By way of example but not limitation, process 300 may be employed in a query matching process associated with web sites and/or other like documents that may be accessed in data files stored in memory as one or more digital signals. By way of example but not limitation, process 300 may include the use of a PSCQ based BM25F formulation, one or more nonlinear features, and/or the like.

At block 302, labeled portion information associated with a plurality of segmented portions of a document may be established and/or otherwise accessed from memory. At block 304, one or more query terms may be obtained, e.g., received and/or otherwise accessed from memory. At block 306, it may be determine if a query match exists between the document and the query terms based, at least in part, on the labeled portion information and the query terms. In certain implementations, at block 306, it may be determined if such query match exists between the document and the query terms based, at least in part, on one or more ranking features and/or a Page Segment Content Quality (PSCQ) model and/or the like. At block 308, transmission of a query result may be initiated. The query result may include and/or otherwise based, at least in part, on at least one determined query match.

With the above example techniques and implementations in mind, it should now be clear that in certain example implementations, a method may be implemented with one or more special purpose computing devices coupled to a memory having one or more digital signals stored therein representing labeled portion information associated with a plurality of segmented portions of a document. The method may include, for example, obtaining one or more digital signals representing one or more query terms, and determining whether a query match exists between the document and the query terms based, at least in part, on the one or more digital signals representing labeled portion information and the one or more obtained digital signals representing one or more query terms. In some examples, the document may include one or more data files associated with a web page that may be displayed.

Furthermore, in some implementations, a method may also include determining whether the query match exists between the document and the query terms based, at least in part, on one or more ranking features. By way of example, a ranking feature may include a segment weighted ranking feature, a segment weighted BM25F feature, a nonlinear feature, and/or any combination thereof. In certain example implementations, a ranking feature may be associated with at least one threshold parameter.

Still further, in some implementations, a method may include determining if the query match exists between the document and the query terms based, at least in part, on a PSCQ model and/or the like. A PSCQ model may, for example, include a PSCQ based BM25F formulation, and/or the like.

Additionally, in some implementations, a method may include initiating transmission of one more digital signals representing a query result based, at least in part, on the determined query match.

Figure 4:
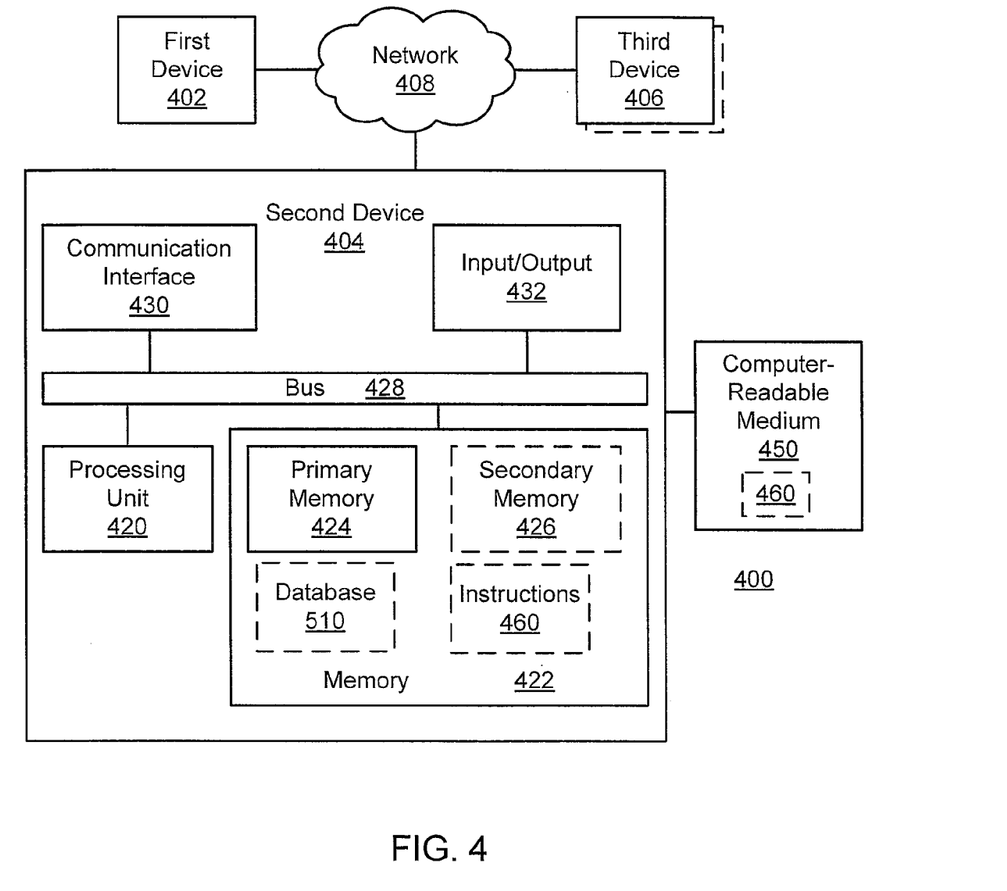
FIG. 4 is a schematic block diagram illustrating an example embodiment of a computing environment having one or more computing devices that may be operatively enabled to form one or more special purpose computing devices in a system supportive of at least a portion of a process, for example, as in FIG. 3, which may perform query matching and/or other like processes based, at least in part, on one or more segmented portions of one or more web pages, in accordance with certain example implementations.

Reference is now made to FIG. 4, which is a block diagram illustrating an exemplary embodiment of a computing environment system 400 all or portions of which may, for example, be used to implement at least a portion of the techniques provided herein, and in particular data processing techniques for classifying and indexing segmented portions of web pages as represented using digital signals.

Computing environment system 400 may include, for example, a first device 402, a second device 404 and a third device 606, which may be operatively coupled together through a network 408.

First device 402, second device 404 and third device 406, as shown in FIG. 4, are each representative of any electronic device, appliance or machine that may be configurable to exchange data over network 408. By way of example but not limitation, any of first device 402, second device 404, or third device 406 may include: one or more computing devices or platforms, such as, e.g., a desktop computer, a laptop computer, a workstation, a server device, data storage units, or the like. Such devices may be transformed in to special purpose computing devices and/or other like apparatuses based, at least in part, on computer implementable instructions 660.

Network 408, as shown in FIG. 4, is representative of one or more communication links, processes, and/or resources configurable to support the exchange of data between at least two of first device 402, second device 404 and third device 406. By way of example but not limitation, network 408 may include wireless and/or wired communication links, telephone or telecommunications systems, data buses or channels, optical fibers, terrestrial or satellite resources, local area networks, wide area networks, intranets, the Internet, routers or switches, and the like, or any combination thereof.

As illustrated, for example, by the dashed lined box illustrated as being partially obscured of third device 406, there may be additional like devices operatively coupled to network 408. Here, for example, third device 406 may represent a plurality of similar or different web page servers, advertisement servers, and/or the like.

It is recognized that all or part of the various devices and networks shown in system 400, and the processes and methods as further described herein, may be implemented using or otherwise include hardware, firmware, or any combination thereof along with software.

Thus, by way of example but not limitation, second device 404 may include at least one processing unit 420 that is operatively coupled to a memory 422 through a bus 428.

Processing unit 420 is representative of one or more circuits configurable to perform at least a portion of a data computing procedure or process. By way of example but not limitation, processing unit 420 may include one or more processors, controllers, microprocessors, microcontrollers, application specific integrated circuits, digital signal processors, programmable logic devices, field programmable gate arrays, and the like, or any combination thereof.

Memory 422 is representative of any data storage mechanism. Memory 422 may include, for example, a primary memory 424 and/or a secondary memory 426. Primary memory 424 may include, for example, a random access memory, read only memory, etc. While illustrated in this example as being separate from processing unit 420, it should be understood that all or part of primary memory 424 may be provided within or otherwise co-located/coupled with processing unit 420.

Secondary memory 426 may include, for example, the same or similar type of memory as primary memory and/or one or more data storage devices or systems, such as, for example, a disk drive, an optical disc drive, a tape drive, a solid state memory drive, etc. In certain implementations, secondary memory 426 may be operatively receptive of, or otherwise configurable to couple to, a computer-readable medium 450. Computer-readable medium 450 may include, for example, any medium that can carry and/or make accessible data, code and/or instructions 460 for one or more of the devices in system 400.

Additionally, as illustrated in FIG. 4, memory 422 may include a data associated with a database 510 (FIG. 5). Such data may, for example, be stored in primary memory 424 and/or secondary memory 426.

Second device 404 may include, for example, a communication interface 430 that provides for or otherwise supports the operative coupling of second device 404 to at least network 408. By way of example but not limitation, communication interface 430 may include a network interface device or card, a modem, a router, a switch, a transceiver, and the like.

Second device 404 may include, for example, an input/output 432. Input/output 432 is representative of one or more devices or features that may be configurable to accept or otherwise introduce human and/or machine inputs, and/or one or more devices or features that may be configurable to deliver or otherwise provide for human and/or machine outputs. By way of example but not limitation, input/output device 432 may include an operatively adapted display (e.g., such as, display device 101 of FIG. 1), speaker, keyboard, mouse, trackball, touch screen, data port, etc.

Thus, as illustrated in the various example implementations and techniques presented herein, in accordance with certain aspects a method may be provided for use as part of a special purpose computing device and/or other like machine that accesses digital signals from memory and processes such digital signals to establish transformed digital signals which may then be stored in memory as part of one or more data files and/or a database specifying and/or otherwise associated with an index.

Some portions of the detailed description have been presented in terms of processes and/or symbolic representations of operations on data bits or binary digital signals stored within memory, such as memory within a computing system and/or other like computing device. These process descriptions and/or representations are the techniques used by those of ordinary skill in the data processing arts to convey the substance of their work to others skilled in the art. A process is here, and generally, considered to be a self-consistent sequence of operations and/or similar processing leading to a desired result. The operations and/or processing involve physical manipulations of physical quantities. Typically, although not necessarily, these quantities may take the form of electrical and/or magnetic signals capable of being stored, transferred, combined, compared and/or otherwise manipulated. It has proven convenient at times, principally for reasons of common usage, to refer to these signals as bits, data, values, elements, symbols, characters, terms, numbers, numerals and/or the like. It should be understood, however, that all of these and similar terms are to be associated with the appropriate physical quantities and are merely convenient labels. Unless specifically stated otherwise, as apparent from the following discussion, it is appreciated that throughout this specification discussions utilizing terms such as "processing", "computing", "calculating", "associating", "identifying", "determining", "allocating", "establishing", "accessing", and/or the like refer to the actions and/or processes of a computing platform, such as a computer or a similar electronic computing device (including a special purpose computing device), that manipulates and/or transforms data represented as physical electronic and/or magnetic quantities within the computing platform's memories, registers, and/or other information (data) storage device(s), transmission device(s), and/or display device(s).

According to an implementation, one or more portions of an apparatus, such as second device 404, for example, may store binary digital electronic signals representative of information expressed as a particular state of the device, here, second device 404. For example, an electronic binary digital signal representative of information may be "stored" in a portion of memory 422 by affecting or changing the state of particular memory locations, for example, to represent information as binary digital electronic signals in the form of ones or zeros. As such, in a particular implementation of an apparatus, such a change of state of a portion of a memory within a device, such the state of particular memory locations, for example, to store a binary digital electronic signal representative of information constitutes a transformation of a physical thing, here, for example, memory device 422, to a different state or thing.

While certain exemplary techniques have been described and shown herein using various methods and systems, it should be understood by those skilled in the art that various other modifications may be made, and equivalents may be substituted, without departing from claimed subject matter.

Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

What is claimed is:

1. A method comprising:
with one or more special purpose computing devices:
processing one or more search query terms submitted to a search engine via a user interface;
processing labeled portions indicative of a plurality of content quality scores for a plurality of segmented portions of a web page,
wherein at least one of the plurality of content quality scores is based, at least in part, upon a classification of a corresponding segmented portion of the plurality of segmented portions according to a type of content of the corresponding segmented portion and without regard to subject matter topic of the content of the corresponding segmented portion;
calculating at least one weighted content quality score for the at least one of the plurality of content quality scores based, at least in part, on at least one measure of frequency of at least one term in the corresponding segmented portion matching the one or more search query terms and at least one measure of a length in words of the corresponding segmented portion;
determining whether a query match exists between the web page and the one or more search query terms based, at least in part, on the labeled portions including the at least one weighted content quality score, and the one or more search query terms; and
initiating transmission to the user interface of at least a portion of a result of the determination.

2. The method as recited in claim 1, wherein the determining is further based, at least in part, on one or more ranking features.

3. The method as recited in claim 2, wherein the one or more ranking features comprises at least one segment weighted ranking feature.

4. The method as recited in claim 3, wherein the at least one segment weighted ranking feature comprises a segment weighted BM25F feature.

5. The method as recited in claim 2, wherein the one or more ranking features comprises at least one nonlinear feature.

6. The method as recited in claim 2, wherein at least one of the one or more ranking features is associated with at least one threshold parameter.

7. The method as recited in claim 1, wherein the determining is further based, at least in part, on a Page Segment Content Quality (PSCQ) model.

8. The method as recited in claim 7, wherein the PSCQ model comprises a PSCQ based BM25F formulation.

9. An apparatus comprising:
memory; and
at least one processing unit implemented, at least in part, by hardware to:
process one or more search query terms to be submitted to a search engine via a user interface;
process labeled portions to be indicative of a plurality of content quality scores for a plurality of segmented portions of a web page,
wherein at least one of the plurality of content quality scores is to be based, at least in part, upon a classification of a corresponding segmented portion of the plurality of segmented portions according to a type of content of the corresponding segmented portion and without regard to subject matter topic of the content of the corresponding segmented portion;
calculate at least one weighted content quality score for the at least one of the plurality of content quality scores based, at least in part, on at least one measure of frequency of at least one term in the corresponding segmented portion matching the one or more search query terms and at least one measure of a length in words of the corresponding segmented portion;
determine whether a query match exists between the web page and the one or more search query terms based, at least in part, on the labeled portions including the at least one weighted content quality score, and the one or more search query terms; and
initiate transmission to the user interface of at least a portion of a result of the determination.

10. The apparatus as recited in claim 9, wherein the determination is further to be based, at least in part, on one or more ranking features.

11. The apparatus as recited in claim 10, wherein the one or more ranking features comprises at least one segment weighted ranking feature.

12. The apparatus as recited in claim 9, wherein the determination is further to be based, at least in part, on a Page Segment Content Quality (PSCQ) model.

13. An article comprising a non-transitory computer readable medium having computer implementable instructions stored thereon which are executable by one or more processing units in a computing device to:
process one or more search query terms to be submitted to a search engine via a user interface;
process labeled portions to be indicative of a plurality of content quality scores for a plurality of segmented portions of a web page,
wherein at least one of the plurality of content quality scores is to be based, at least in part, upon a classification of a corresponding segmented portion of the plurality of segmented portions according to a type of content of the corresponding segmented portion and without regard to subject matter topic of the content of the corresponding segmented portion;
calculate at least one weighted content quality score for the at least one of the plurality of content quality scores based, at least in part, on at least one measure of frequency of at least one term in the corresponding segmented portion matching the one or more search query terms and at least one measure of a length in words of the corresponding segmented portion;
determine whether a query match exists between the web page and the one or more search query terms based, at least in part, on the labeled portions including the at least one weighted content quality score, and the one or more search query terms; and
initiate transmission to the user interface of at least a portion of a result of the determination.

14. The article as recited in claim 13, wherein the determination is further to be based, at least in part, on one or more ranking features.

15. The article as recited in claim 14, wherein the one or more ranking features comprises at least one segment weighted ranking feature.

16. The article as recited in claim 13, wherein the determination is further to be based, at least in part, on a Page Segment Content Quality (PSCQ) model.

* * * * *